Patented Dec. 4, 1928.

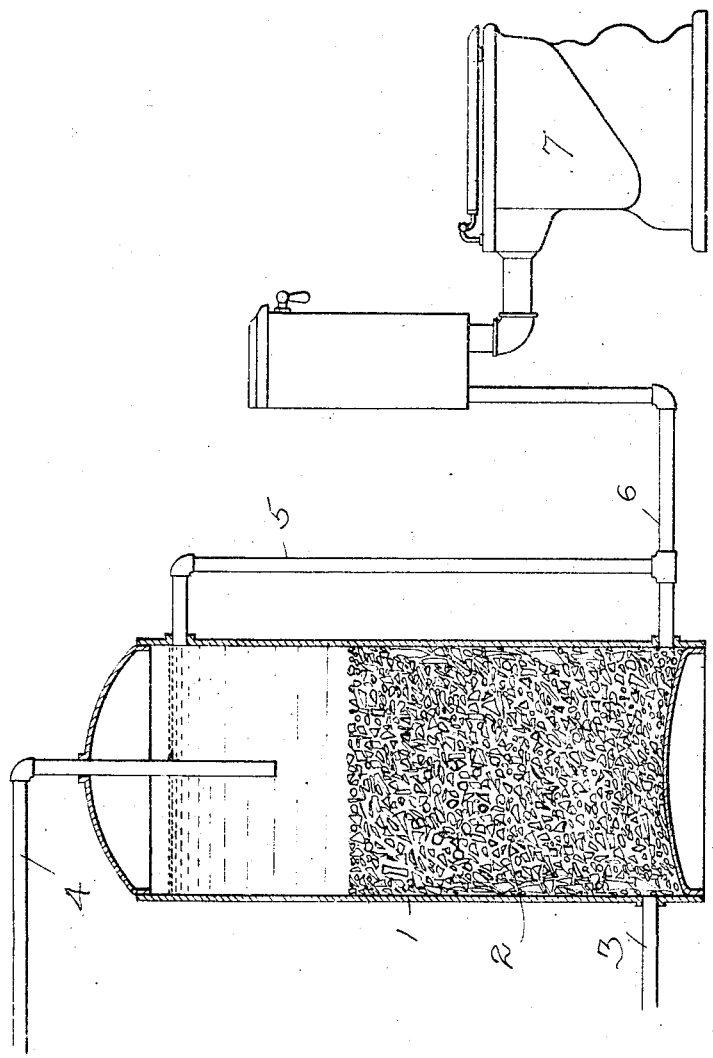

1,693,873

UNITED STATES PATENT OFFICE.

ELI WALTER SHAWEN AND ALBERT C. ARNETT, OF DAYTON, OHIO.

WATER-SOFTENING SILICATE AND PROCESS OF PRODUCING SAME.

Application filed February 9, 1925. Serial No. 7,887.

Our invention relates to water purification by the filtration method, and more particularly to an improved filter material.

At the present time the use of individual household water softeners or filtration apparatus is growing in popularity. The usual method of softening is to circulate the raw or hard water under pressure through a filter bed of natural sand or clay, commonly known as "zeolites", which reacts with and separates from the water during its filtration, the lime content. Such filter material is usually of fine granular form, which forms a compact solid bed. This filter bed in time becomes permeated with the separated lime sludge and must be renewed or rejuvenated by circulating strong salt brine therethru, and subsequently washing the filter bed to renew its water softening activity. One of the difficulties encountered in such filter bodies of fine granular material is that the water will not circulate uniformly thruout the entire filter bed, but will form bores or channels through certain restricted areas, the remainder of the bed becoming close packed and resistant to the passage of the water.

The object of the present invention is to provide a filter material which will exert a chemical reaction upon the water passing therethrough to effect the separation and precipitation of the lime content, which material will be of a coarse porous characteristic.

The material being preferably of the size of small gravel, each body being more or less porous, a filter bed of such material will not become compacted and resist the circulation of water, but will permit uniform distribution of the water supply thruout the entire body of filter material.

The object of the invention is to provide a new and improved method of softening water and to provide improved filter material or agent for effecting the precipitation of the lime contents and softening of the water, which will be cheap to manufacture, capable of retaining its active softening characteristics over long periods of use without the necessity for frequent rejuvenation, and which will not have the tendency of retaining or holding the separated matter, but will leave the deposit of lime free to be easily removed.

With the above primary and other incidental objects in view as will more fully appear from the specification, the invention consists of the materials and combinations thereof, and the mode of preparation, as well as the mode of operation, or their equivalents as hereinafter described and set forth in the claims.

In the preparation of the filter material, a quantity of clay earth and bicarbonate of soda are mixed thoroughly and uniformly in the approximate proportions of nine parts of clay to one part of bicarbonate of soda. These portions are mentioned for illustration and not with intent of limiting the relative proportions of ingredients. The quantity of bicarbonate of soda if desired may be increased much beyond the proportion mentioned, even to the extent of one fourth or more of the mixture. The mixture of clay earth and sodium bicarbonate is then moistened with sufficient vinegar or acidified water to make the mass plastic. The addition of the vinegar reacting upon the soda causes the mass to effervesce rendering the clay body more or less porous by the formation of minute gas pockets therein. The molded mass is then heated substantially to the fusing point of the clay so that the body becomes hard and brick like. The body of mixture while yet in a highly heated condition is crushed to particles of approximately small gravel size, and a mixture of bicarbonate of soda and sodium chloride or common salt is then sprinkled over the crushed portion and the broken mass is quenched by being submerged in a saturate solution of bicarbonate of soda and sodium chloride or common salt. The resultant product is a hard burned coarse material, in which the soda content is insolubly incorporated. The gravel like portions are more or less porous, and are of such shape and size that they will not closely compact in the filter bed to prevent free circulation of the water. It has been found by experiment that hard water or water highly charged with carbonate of lime and other like minerals, which render the water undesirable for household use is acted upon and affected during its circulation through the filter bed to cause the separation and deposit of the mineral content of the water which may be drained off from the bottom of the filter bed while the softened water is withdrawn from the top. The usual installations of such water softening filters is to connect the supply of raw or hard water to the bottom of such filter bed, causing the water to circulate upward therethrough, the soft water being withdrawn at the top. It has been found by experience in he use of the present filter material that the lime may be drawn off in a flaky sediment and that even after long periods of use, the effect of the filter material is unimpaired and does not require the frequent rejuvenation or regeneration by use of salt brine as is the case with natural sand or zeolites.

While the material prepared as heretofore described is found efficient and thorough in most instances, it has been found, however, for water of peculiar hardness or of particular mineral content, the addition of a quantity of magnesium intermixed with the soda in equal proportion or less, will be found beneficial, and will increase the rapidity of the softening action.

Instead of attracting and holding the separated mineral ingredients, as is the case with natural sand softening agents, the present softening material frees the lime and extracted matter much of which is precipitated to the bottom of the tank or filter vessel from which it may be withdrawn through a drain cock. Sometime some of the lighter particles of separated matter will float to the top of the filter vessel. For this reason the distribution offtake from the softener is submerged while an overflow outlet is provided through which may be drained the floating particles of freed matter.

In the accompanying drawing which is a diagrammatic illustration of a typical installation, the softener is connected for the automatic disposal of the precipitate or lime sludge, by discharging the waste material through a toilet stool, each time the toilet is flushed. In the drawing, 1 is the softener tank containing a deposit 2 of catalytic softening agent prepared as herein described. The hard water is admitted at the bottom of the softener tank 1, thru the inlet pipe 3. It is circulated upward thru such filter bed 2 during which time it is acted upon to effect the separation and deposit of the lime content and like material. The softener water is withdrawn thru the outlet or distribution pipe 4, the intake end of which is somewhat lower than an overflow pipe 5, thru which floating particles forming a scum are withdrawn. Leading from the bottom of the vessel 1 and from the side opposite the intake 3 is a drain pipe 6 with which the overflow pipe 5 communicates and which discharges thru the flush tank of the toilet 7, each time the toilet is flushed. Thus sediment is flushed out of the softener tank at more or less frequent intervals without necessity of especial attention being given.

From the above description it will be apparent that there is thus provided a softening material of the character described, possessing the particular features of advantage before enumerated as desirable, but which obviously is susceptible of modification in its ingredients, proportions, and arrangement without departing from the principle involving or sacrificing any of its advantages.

While in order to comply with the statute the invention has been described in language more or less specific as to component parts, it is to be understood that the invention is not limited to the specific details, but that the means herein disclosed comprises the preferred form of several modes of putting the invention into effect and the invention is, therefore, claimed in any of its forms or modifications within the legitimate and valid scope of the appended claims.

Having thus described the invention, we claim:

1. The herein described method of preparing water softening filter material consisting in intermixing clay and bicarbonate of soda, moistening the mixture with an acidified liquid, and heating to approximately the fusing point of the clay.

2. The herein described method of preparing filter material for water softening purposes, consisting in intermixing together a clay and a quantity of sodium bicarbonate, rendering the mixture porous and subjecting the porous mixture to heat treatment, the portion of clay being in excess of the portion of soda to form an insoluble porous body, broken pieces of which in the presence of lime charged water will have the effect of separating the lime content from the water.

3. The herein described method of preparing filter material for water softening purposes, consisting in intermixing sodium bicarbonate with clay earth, acidifying the mixture and subjecting the mixture to high temperature, crushing the resultant mass to approximately gravel size and while yet hot applying sodium chloride to the broken particles.

4. As an article of manufacture, water softening filter material comprising pieces of material of porous vitreous character in which sodium bicarbonate has been incorporated prior to heat treatment thereof, the resulting material being subjected while hot to a treatment of sodium chloride.

5. As an article of manufacture, water softening filter material comprising pieces of material of porous vitreous character in which sodium bicarbonate has been incorporated prior to heat treatment thereof, the material being subsequently subjected to treatment with sodium chloride and magnesium.

6. The herein described method of treating clay within an alkali and an acid by which effervescence is effected throughout the mass of clay and burning the clay mass to afford a hard body of porous character.

In testimony whereof, we have hereunto set our hands this 20th day of January, A. D. 1925.

ELI WALTER SHAWEN.
ALBERT C. ARNETT.